Jan. 5, 1960

W. B. BERNARD 2,920,290

SATURABLE BRIDGE MODULATOR

Filed Jan. 31, 1957

INVENTOR.
WILLIAM B. BERNARD
BY George Sipkin
George E. Pearson
ATTORNEYS

United States Patent Office 2,920,290

Patented Jan. 5, 1960

2,920,290

SATURABLE BRIDGE MODULATOR

William B. Bernard, Arlington, Va.

Application January 31, 1957, Serial No. 637,601

1 Claim. (Cl. 332—51)

Figure 1:
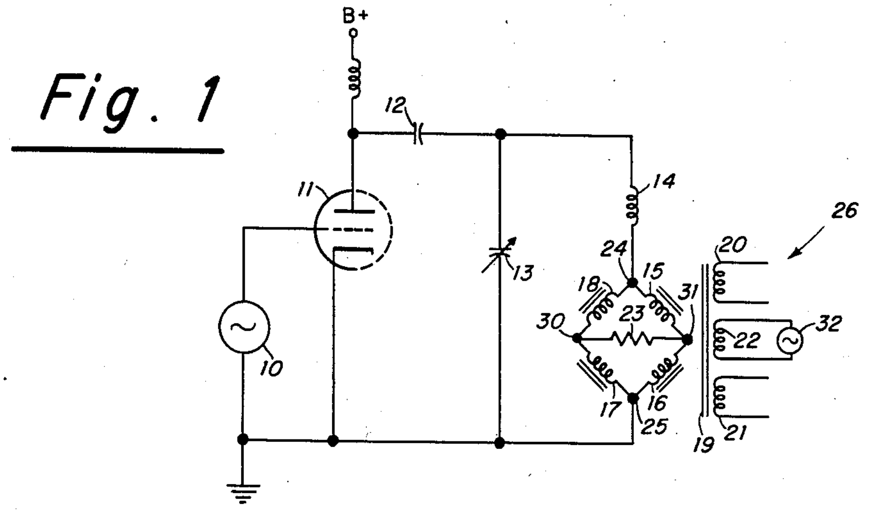

(Granted under Title 35, U.S. Code (1952), sec. 266)

The invention described herein may be manufactured and used by or for the Government of the United States of America for governmental purposes without the payment of any royalties thereon or therefor.

The present invention relates to a modulation system and more particularly to a modulation system in which modulation of radio frequency energy is accomplished by means of a bridge circuit load therefor, means being provided for unbalancing the bridge circuit at the modulation frequency whereby the desired amplitude modulation of the radio frequency energy appears in the output of the bridge while the bridge presents a constant impedance load to the radio frequency energy.

Heretofore radio frequency amplifier systems which normally operate with high efficiency when unmodulated are lowered in efficiency when associated with known modulators because the amplifier becomes untuned resulting in an inefficient transfer of energy.

According to the present invention, an initially balanced bridge circuit is employed having variable saturable magnetic inductors of like initial inductance connected to form the bridge. The radio frequency source to be modulated is connected across one pair of opposite junctions of the inductors and the load is connected between the other pair of junctions. The entire bridge is placed in a suitable state of initial magnetic saturation and a magnetic field producing means which is responsive to the variations of the modulating source is so coupled to the bridge such that an unbalance of the bridge results, producing an amplitude variation of the radio frequency energy fed to the load which varies in accordance with the variations of the modulating source. The impedance of the bridge remains fixed and accordingly an efficient transfer of modulated energy to the load is obtained thus providing more efficient overall operation of a modulated amplifier than heretofore.

An object of the present invention is the provision of an improved modulation circuit.

Another object is to provide an improved modulation circuit for obtaining greater efficiency of the modulated amplifier system.

Another object is to provide a modulation system in which a radio frequency voltage is modulated by modulating the load impedance therefor.

A further object of the invention is the provision of an improved modulation circuit for obtaining greater efficiency of the modulated amplifier system wherein the modulation circuit impedance remains fixed.

A final object is to provide an improved modulation circuit for obtaining greater efficiency of the modulated amplifier system wherein the modulation circuit impedance remains fixed and the amplifier output tank circuit remains tuned.

Figure 2:
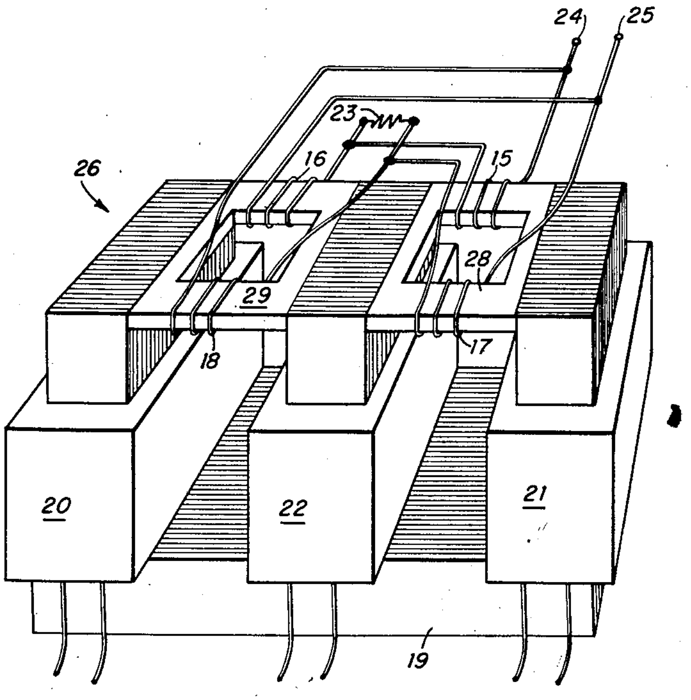

Other objects and many of the attendant advantages of this invention will be readily appreciated as the same becomes better understood by reference to the following detailed description when considered in connection with the accompanying drawings wherein:

Fig. 1 is a schematic diagram of the modulation system incorporating the modulator circuit; and Fig. 2 is a perspective view of the modulator circuit of Fig. 1.

Referring now to the drawings, wherein like reference characters designate like or corresponding parts throughout the several views, there is shown in Fig. 1 a source of high frequency energy 10, fed into the grid of a tube 11. Plate voltage for the tube is supplied from a source B+ through an inductor 27 in a conventional manner. A capacitor 12 couples the plate to a tank circuit which includes a variable capacitor 13 in parallel with an inductor 14 and a modulator circuit generally designated by the numeral 26 in series. The modulator circuit, as shown in Figs. 1 and 2, includes a plurality of inductors 15, 16, 17, and 18 of like inductance connected to form a bridge wherein inductors 15 and 17 are coiled around portions of an iron core 28 and the inductors 16 and 18 are coiled around portions of an iron core 29, as shown in Fig. 2. One pair of opposite junctions 24 and 25 of the inductors is connected in series with the inductor 14. A load 23 is connected across the other pair of junctions 30 and 31. The saturable iron cores 28 and 29 are positioned in the gaps of a stack of transformer E laminations 19, as shown in Fig. 2. Coils 20 and 21 are provided on the outer legs of the E laminations which are energized by a direct current source so as to provide the cores 28 and 29 with a suitable state of initial saturation. A modulating signal coil 22 is positioned around the center leg of the E laminations and connected to a modulating source 32.

The operation of the device is as follows: The high frequency energy of constant amplitude which is to be modulated is generated by the generator 10 and fed into the grid of tube 11 wherein it is amplified and then fed to the tank circuit which includes the capacitor 13, the inductor 14, and the initially balanced bridge circuit of variable iron core inductors 15—18 of like initial inductance connected to form the bridge. A direct current in the coils 20 and 21 places the entire bridge and its inductor elements in a suitable state of initial magnetic saturation. Accordingly, the inductances of the individual inductors and consequently the inductance of the bridge becomes fixed, depending on the amount of magnetic flux permeating the inductors. Moreover, at a given frequency the impedances of the individual inductor elements and the bridge also becomes fixed. The tank circuit is then tuned to resonance by means of capacitor 13. The application of a modulating signal from the source 32 to coil 22 produces an additional varying magnetic field in the iron core inductors which simultaneously increases and decreases equally the magnetic flux saturating opposite pairs of inductors, respectively. This results in a simultaneously equal increase and decrease in the impedance of opposite pairs of inductors, respectively, which varies in accordance with the variations of source 32. The bridge becomes unbalanced but remains fixed in impedance and the amplitudes of the voltages appearing across the inductors and the load 23 vary in accordance with the variations of source 32.

Obviously many modifications and variations of the present invention are possible in the light of the above teachings. It is therefore to be understood that within the scope of the appended claims, the invention may be practiced otherwise than as specifically described.

What is claimed is:

A constant impedance modulation system comprising a first pair of series connected variable saturable magnetic inductors, a second pair of series connected variable saturable magnetic inductors connected in parallel therewith at a first pair of oppositely disposed junctions to form a closed impedance bridge circuit, an inductance having two terminals one of which is coupled to one of said first pair of oppositely disposed junctions, a variable capacitance connected between the other terminal of said inductance and the other of said first pair of oppositely disposed junctions to form a parallel tank circuit adapted to be tuned to a predetermined resonant frequency, means for simultaneously applying an amplified radio frequency signal directly across said tank circuit and said variable capacitance, a transformer contiguously disposed with said impedance bridge circuit for electromagnetic association therewith, said transformer including an iron core with a first coil and a second coil wound thereon responsive to a direct current source and adapted to be energized thereby in such manner to hold the impedance of said bridge circuit constant by placing same in a state of magnetic flux saturation, a third coil mounted on said core responsive to variations of a modulating signal for simultaneously increasing and decreasing equally the magnetic flux of opposite pairs of said magnetic inductors, respectively, in synchronization therewith to unbalance said bridge circuit, and a resistance means connected across a second pair of oppositely disposed junctions constituting the respective interconnection of the series connected inductors of both said first and second pairs of series connected variable saturable magnetic inductors, whereby said bridge is unbalanced when said modulating signal is applied to said third coil and an output signal is produced across said resistance means which varies in amplitude in accordance with the variations of said modulating signal without changing the total impedance of said bridge circuit or de-tuning said resonant tank circuit.

References Cited in the file of this patent

UNITED STATES PATENTS

| | | |
|---|---|---|
| 1,267,018 | Von Arco et al. | May 21, 1918 |
| 1,824,577 | Sorensen | Sept. 22, 1931 |
| 1,933,627 | Jauman | Nov. 7, 1933 |
| 2,114,856 | Neidhart | Apr. 19, 1938 |
| 2,781,420 | Eno | Feb. 12, 1957 |

FOREIGN PATENTS

| | | |
|---|---|---|
| 540,456 | Great Britain | Oct. 17, 1941 |
| 642,840 | France | Sept. 5, 1928 |